Feb. 7, 1956   L. A. DICKINSON   2,733,568
SOLID PROPELLANT JET REACTION MOTOR
Filed Jan. 5, 1955
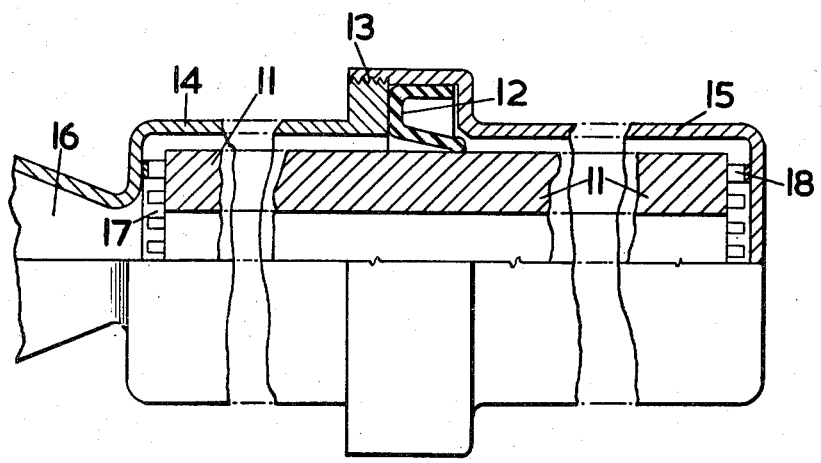
Lionel Arthur Dickinson, Inventor
By G. D. O'Brien, Attorney

2,733,568
SOLID PROPELLANT JET REACTION MOTOR

Lionel Arthur Dickinson, Southcourt, Aylesbury, England, assignor to the Minister of Supply in Her Majesty's Government of the United Kingdom of Great Britain and Northern Ireland, London, England Application January 5, 1955, Serial No. 480,028

3 Claims. (Cl. 60—35.6)

This invention relates to solid propellant jet reaction motors of the kind comprising a container and a filling or charge of cordite or other solid propellant in thick walled tubular form which is ignited at that end remote from the discharge end of the container and of which the burning takes place from its inner parts towards its outer surface i. e. radially outwardly rather than from end to end.

It is frequently the practice for the charge to be inhibited, i. e. coated or treated to prevent or delay burning thereof, at its outer and end faces and to provide a seating at the discharge end of the container against which the charge is caused to bear by the differential pressure of the hot gases during burning to prevent the flow of hot gases between the outer surface of the charge and the inner surface of the container. In this way the charge itself (or the outer part at least of the charge) is utilized as an insulator to protect the container from the heat evolved by the burning.

It will be seen, however, that any leakage at such a discharge end seal, which is near to the hot gases leaving the container will allow hot gases to flow between the charge and the container wall, not only heating the latter but also, despite the inhibition of the charge, soon causing the latter to burn at and from its outer surface and so still further to heat the container wall.

The invention has for an object to provide more effective and reliable sealing or obturation for preventing the flow of hot gases between the charge and the container wall, and, to this end and in accordance with the invention, the space between the container wall and an externally inhibited charge of a jet reaction motor of the kind referred to is open to the interior of the charge at both ends and a resilient sealing washer through which the charge extends is caused to bear inwardly upon the charge and/or outwardly upon the wall of the container by the differential pressure due to burning.

The sealing washer may be secured gas tight to the charge, or, alternatively, to the container and it may be of substantially U-shaped section in which case it need only be held against undue axial movement relative to the container and charge under the differential pressure.

The casing may be formed with an internal annular recess to provide space for the sealing washer and for holding it against axial movement. In some cases an outer rim or margin of the sealing washer may be clamped in position within such a recess or between two axially displaceable portions of the container. Similarly, an inner rim or margin of the sealing washer may be gripped within a recess in the charge e. g., by being embedded in and, it may be, adhering to the material of the charge, in which event the embedded part of the washer may be under-cut or otherwise formed for more effective anchorage in the charge.

It is a feature of the invention to form the container at the head side at least of the sealing washer of material which is less resistant to heat than that of the usual gas ejection nozzle. For example, the container may comprise a short outlet end portion formed from steel integrally with an outlet nozzle and a long main or head portion formed from light alloy.

One form of the invention is illustrated by the accompanying diagrammatic drawing which is a half-sectional longitudinal elevation which is not to scale and has had parts broken away.

As shown, the usual thick walled hollow cylindrical cordite or other solid propellant charge, indicated at 11, whose outer and end faces are inhibited is surrounded intermediately of its length by a resilient U-section sealing ring 12 which is accommodated in a recess formed at the screw thread junction 12 of the two parts 14 and 15 of a casing which is divided intermediately of its length.

The portion 14 of the casing is formed from steel integrally with an ejection nozzle 16, and the portion 15 is formed from light alloy, the steel nozzle portion 14 being shorter than the light alloy portion 15.

Both portions 14 and 15 have castellations at their inner end faces as indicated at 17 and 18, respectively, to ensure free passage for air or gases between the interior of the charge 11 and the annular space between it and the container wall.

In operation, the gas pressure at the end remote from the nozzle end is greater than that at the nozzle end of the container and in consequence the sealing ring 12 is pressed into tight sealing engagement with the inner surface of the casing in the recess at the screw joint 13 and with the outer, inhibited surface of the charge, thus preventing appreciable flow of hot gases over the end and outer surfaces of the charge 11, the charge itself and the air and/or gases so trapped in the annular space between the charge and the container wall protecting the sealing ring 13 against hot or burning gases.

In a modification, the resilient sealing ring is in part embedded in the material of the charge from which it extends to bear resiliently upon the internal surface of the container which is not necessarily formed with an internal recess.

I claim:

1. In a jet reaction motor of the type having an elongated generally cylindrical tubular casing with an exhaust nozzle at its rear end, the casing being closed at its forward end, an elongated tubular externally inhibited and internally burning solid propellant grain disposed within the casing to provide an annular space between its outer surface and the inside surface of the casing, said space communicating with the inside of the grain at both ends thereof, and means for preventing flow of gas longitudinally through said space in a rearward direction, said means comprising an annular resilient sealing washer, U-shaped in cross section, disposed between the ends of said space, the open side of the U facing in a direction toward the forward end of the casing.

2. Apparatus in accordance with claim 1 wherein said washer is disposed in an annular recess in the casing.

3. Apparatus in accordance with claim 2 wherein said casing is so constructed to be assembled and joined together with a joint disposed adjacent said recess.

References Cited in the file of this patent

FOREIGN PATENTS 1,075,081    France _____ Apr. 7, 1954